Patented Apr. 15, 1952

2,592,776

UNITED STATES PATENT OFFICE 2,592,776

CELLULOSE LOWER ALKANOATE PLASTIC COMPOSITION

Edward J. Wickson, South Orange, and Walter D. Paist, Berkley Heights, N. J., assignors to Celanese Corporation of America, New York, N. Y., a corporation of Delaware No Drawing. Application December 16, 1949, Serial No. 133,468

3 Claims. (Cl. 106—177)

This invention relates to thermoplastic compositions and relates more particularly to fire-retardant thermoplastic compositions having a basis of cellulose acetate or other organic acid ester of cellulose.

An important object of this invention is the provision of fire-retardant thermoplastic compositions having a basis of cellulose acetate or other organic acid ester of cellulose which may be compounded without difficulty and which possess outstanding physical and chemical properties.

Another object of this invention is the provision of fire-retardant thermoplastic compositions having a basis of cellulose acetate or other organic acid ester of cellulose plasticized with a mixture of tripropyl phosphate and triphenyl phosphate.

Other objects of this invention will be apparent from the following detailed description and claims.

As is well known, fire-retardant thermoplastic compositions having a basis of cellulose acetate or other organic acid ester of cellulose may be prepared by incorporating a suitable plasticizer in said cellulose esters. While many of the plasticizers previously suggested for this purpose such as, for example, the trialkyl phosphates, produce thermoplastic compositions whose fire-retardant qualities are satisfactory, difficulties are often experienced in compounding these compositions and the physical and chemical properties of many of these thermoplastic compositions are deficient in one or more respects. Thus, certain of the previously suggested trialkyl phosphates, e. g. tributyl phosphate, liberate extremely irritating fumes when raised to elevated temperatures during the production and processing of thermoplastic compositions containing the same. Other trialkyl phosphates, such as triethyl phosphate, for example, yield thermoplastic compositions that have poor moisture resistance and heat stability, and in the presence of moisture, liberate materials that corrode carbon steel and chromium plated carbon steel. In addition, the mixing of thermoplastic compositions containing triethyl phosphate is difficult, owing to the tendency thereof to form lumps and to the volatilization of an appreciable amount of the plasticizer during the working of the compositions on malaxating rolls. Tripropyl phosphate, when employed as the sole plasticizer, yields thermoplastic compositions that are free from some of the deficiencies specified above. However, such thermoplastic compositions containing tripropyl phosphate as the sole plasticizer have a low moisture resistance, poor dimensional stability and a high volatility on heating and, in addition, are difficult to compound, owing to the high solvent power of the tripropyl phosphate for the cellulose esters.

According to the present invention, fire-retardant thermoplastic compositions having a basis of cellulose acetate or other organic acid ester of cellulose and free from the deficiencies specified above are prepared by plasticizing said cellulose esters with a mixture of tripropyl phosphate and triphenyl phosphate. The fire-retardant thermoplastic compositions of this invention may be mixed without difficulty since the plasticizers may be distributed uniformly throughout the cellulose esters without the formation of lumps, the liberation of irritating fumes, or the volatilization of any appreciable amount of the plasticizers during the working of the compositions on malaxating rolls. In addition, the fire-retardant thermoplastic compositions of this invention possess a very high impact strength, improved moisture resistance and improved heat stability, and show less corrosive tendencies than compositions made with triethyl phosphate or triphenyl phosphate, or even mixtures of both. The fire-retardant thermoplastic compositions prepared in this manner are, therefore, eminently suited for a wide variety of applications.

In preparing the fire-retardant thermoplastic compositions of this invention, from about 5 to 45% by weight of tripropyl phosphate based on the weight of the cellulose ester and from about 5 to 30% by weight of triphenyl phosphate based on the weight of the cellulose ester are incorporated into the cellulose acetate or other organic acid ester of cellulose. The combined content of tripropyl phosphate and triphenyl phosphate should be sufficient to yield a combined phosphate content, calculated as phosphoric acid, of at least about 6% by weight or preferably at least about 10% by weight based on the weight of the cellulose ester to impart the desired fire-retardant properties to the thermoplastic composition.

In addition to the plasticizers, the fire-retardant thermoplastic compositions of this invention may contain dyes, pigments, nacreous materials and other substances having a decorative effect. They may also contain stabilizers, ultraviolet light absorbing substances, and the like.

Where the novel fire-retardant thermoplastic compositions of this invention are to be employed as molding powders for the production of injection or compression moldings, or for extrusion operations, the molding powders may be prepared in a manner well known in the art. For example, the cellulose ester may be mixed with the tripropyl phosphate in which is dissolved the triphenyl phosphate and passed repeatedly through the nip of heated malaxating rolls until it is rendered homogeneous. The mixture is taken off the malaxating rolls in the form of thin sheets, cooled and then broken into particles of a convenient size for use in molding and extrusion devices.

For the production of films and foils by the casting process, the cellulose ester, together with the desired amounts of tripropyl phosphate and triphenyl phosphate, may be dissolved in a solvent or solvent mixture and the resulting solution deposited on a casting surface. Upon removal of the solvent or solvent mixture, the films or foils may be readily stripped from the casting surface.

In addition to cellulose acetate, other organic acid esters of cellulose that may be employed in preparing the thermoplastic compositions of this invention, are, for example, cellulose propionate, cellulose butyrate, cellulose acetate-propionate and cellulose acetate-butyrate.

The following examples are given to illustrate this invention further.

*Example I*

To 100 parts by weight of cellulose acetate, there is added 26 parts by weight of tripropyl phosphate having dissolved therein 20.5 parts by weight of triphenyl phosphate. The mixture is loaded on malaxating rolls maintained at a temperature of about 150° C. and rolled until it is homogeneous. During the mixing and rolling there is very little tendency toward lumping and no highly irritating fumes are given off.

*Example II*

A sample of the molding powder prepared in Example I is molded into a bar. The bar exhibits an Izod impact strength of 4.2 foot pounds/inch notch. A comparative control bar containing for every 100 parts by weight of cellulose acetate 46 parts by weight of diethyl phthalate as the sole plasticizer exhibits an Izod impact strength of only 3.7 foot pounds/inch notch.

*Example III*

A sample of the molding powder prepared in Example I is molded into a bar. The bar is held for 24 hours at 100° F. and 100% relative humidity and then for an additional 24 hours at 140° F. After one such cycle the bar exhibits a shrinkage of 0.1%. After two such cycles the bar exhibits a shrinkage of 0.2%. The control bar exhibits shrinkages of 0.2% and 0.4% after one and two cycles, respectively.

*Example IV*

A sample of the molding powder prepared in Example I is dried for three hours at 100 to 110° C. A layer of the molding powder about ¼" thick is spread on the surface of a carbon steel plate and on the surface of a chromium plated carbon steel plate. The samples are placed in sealed jars and held at a temperature of 125° C. After two weeks, there is no sign of corrosion on the surface of either plate. A control made with 20 parts by weight of triphenyl phosphate and 22 parts by weight of triethyl phosphate for each 100 parts by weight of cellulose acetate tarnishes the carbon steel plate badly and strains the chromium plated carbon steel plate noticeably.

*Example V*

A molded bar is prepared in the manner set forth in Example II, employing 12 parts by weight of triphenyl phosphate and 40 parts by weight of tripropyl phosphate for each 100 parts by weight of cellulose acetate. The bar exhibits an Izod impact strength of 5.4 foot pounds/inch notch. The bar also exhibits excellent fire resistance.

*Example VI*

A molded bar is prepared in the manner set forth in Example II, employing 10 parts by weight of tripropyl phosphate and 35 parts by weight of triphenyl phosphate together with 100 parts by weight of cellulose propionate. The bar exhibits better dimensional stability than a comparable bar plasticized with tripropyl phosphate as the sole plasticizer. The bar also exhibits better fire resistance than a comparable bar plasticized with triphenyl phosphate as the sole plasticizer.

It is to be understood that the foregoing detailed description is given merely by way of illustration and that many variations may be made therein without departing from the spirit of our invention.

Having described our invention, what we desire to secure by Letters Patent is:

1. A thermoplastic composition comprising a lower fatty acid ester of cellulose having incorporated therein a mixture of from about 5 to 45% by weight of tripropyl phosphate based on the weight of the cellulose ester and from about 5 to 30% by weight of triphenyl phosphate based on the weight of the cellulose ester, the combined phosphate content of the thermoplastic composition, calculated as phosphoric acid, being at least about 10% by weight based on the weight of the cellulose ester.

2. A thermoplastic composition comprising cellulose acetate having incorporated therein a mixture of from about 5 to 45% by weight of tripropyl phosphate based on the weight of the cellulose acetate and from about 5 to 30% by weight of triphenyl phosphate based on the weight of the cellulose acetate, the combined phosphate content of the thermoplastic composition, calculated as phosphoric acid, being at least about 10% by weight based on the weight of the cellulose acetate.

3. A thermoplastic composition comprising cellulose acetate having incorporated therein a mixture of 26% by weight of tripropyl phosphate based on the weight of the cellulose acetate and 20.5% by weight of triphenyl phosphate based on the weight of the cellulose acetate.

EDWARD J. WICKSON.
WALTER D. PAIST.

REFERENCES CITED

The following references are of record in the file of this patent:

UNITED STATES PATENTS

| Number | Name | Date |
| --- | --- | --- |
| 2,021,901 | Smith | Nov. 26, 1935 |
| 2,464,784 | Easton | Mar. 22, 1949 |